J. Adair.
Card Rack.

No. 3,061. Reissued Aug. 4, 1868.

Witnesses
R. A. Wrenshall
Thos. B. Kerr

Inventor
James Adair
by Bakewell & Christy
his Att'ys.

N. PETERS, PHOTO-LITHOGRAPHER, WASHINGTON, D. C.

UNITED STATES PATENT OFFICE.

JAMES ADAIR, OF PITTSBURG, PENNSYLVANIA.

IMPROVEMENT IN CARD-RACKS.

Specification forming part of Letters Patent No. 58,363, dated October 2, 1866; Reissue No. 3,061, dated August 4, 1868.

*To all whom it may concern:*

Be it known that I, JAMES ADAIR, of Pittsburg, in the county of Allegheny and State of Pennsylvania, have invented a new and useful Improvement in Spring-Racks; and I do hereby declare the following to be a full, clear, and exact description of the same, reference being had to the accompanying drawing, and to the letters of reference marked thereon—

Figure 1:
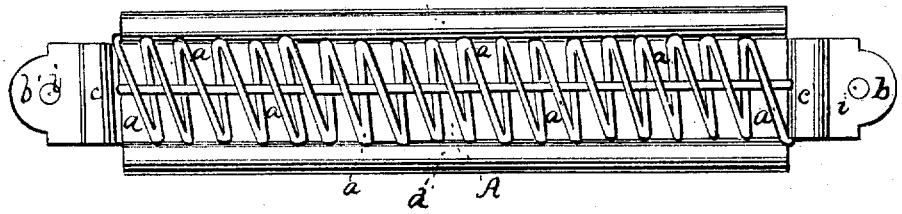
Figure 2:
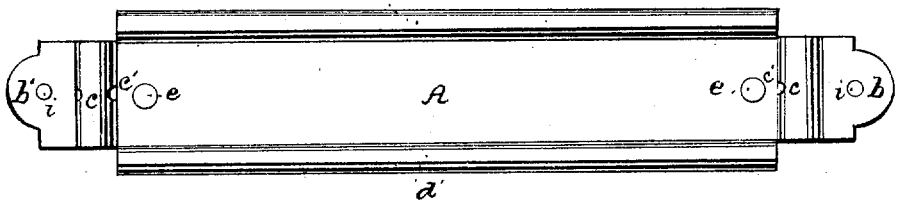
Figure 4:
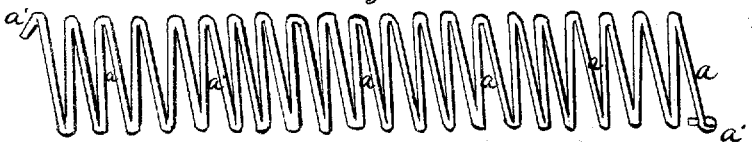
Figure 3:
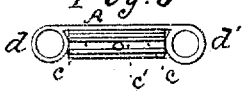
Figure 5:
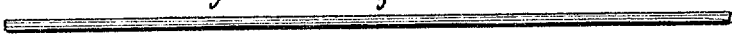

Figure 1 being a top or face view of my improved spring-rack; Fig. 2, a face view of the finished bed or fastening plate; Fig. 3, a cross-section of the same; Fig. 4, the coiled or spiral spring; and Fig. 5, the rod for fastening the spiral spring to the bed-plate.

The nature of my invention consists, first, in the construction and use of a wire spring of spiral or other continuous curve, when so made as to be fastened, either by a bed-piece or otherwise, to a table, desk, secretary, pedestal, or other like object, as a holder for pens, pencils, letters, cards, brushes, tools, and other similar articles; second, in making a bed-piece or fastening-plate with raised sides and ends, so that a spring of continuous curve placed in the rectangular space inclosed therein, and properly fastened, shall be secured against undue lateral and transverse motion; third, in fastening a spring of continuous curve, or a series of such springs, to a bed-piece by a fastening-rod passing longitudinally through or along the spring or springs, and secured at each end to the bed-piece; and fourth, in the combination of a wire spring of spiral or other continuous curve with a metallic bed-piece, by which to fasten the spring to a table, pedestal, or other like object.

To enable others skilled in the art to make and use my invention, I will proceed to describe its construction and manner of use.

In making the spring, I take wire of the proper weight, and possessing the proper elasticity, and by any known devices coil the same, so as to make a spiral spring, *a*, of any desirable or convenient length. At the extremities of such coil I make eyes or loops, or merely turn-hooks *a'*, by which to attach it either with or without an intervening bed-piece, A, to a secretary, desk, table, pedestal, or other fixed object where or with which it may be desired for use.

The bed-piece A is made of a rectangular piece of sheet metal, somewhat longer and wider than the spiral spring *a*. From each corner of such strip a rectangular piece is cut away, or the ends may be otherwise trimmed, so as to form projections or tongues *b b'*, of uniform size and shape. The corners may be rounded off, for the sake of ornament. Each lateral edge or border of this strip A is then folded over a properly-constructed mandrel, or otherwise so folded as to form tubes *d d'*; or, if so preferred, merely a corrugation, made by swaging or in other convenient manner, may be substituted therefor, the convex surface of such corrugation being uppermost.

Across each of the tongues *b b'*, near the flat part or body of the bed-piece A, a corrugation, *c*, is formed, sufficiently high to admit of its being punched, as at *c'*, the holes *c'* passing through the corrugation *c* on the side next the flat part or body of the bed-piece A, and also nearly or exactly in a line running lengthwise of the bed-piece A, midway between its sides. In about the same line, and a short distance inside the corrugations *c*, a slight indentation, projecting upward, is made in the bed-piece A, or holes *e* are punched through, with edges projecting upward, for purposes presently to be stated.

The spring *a* is placed on its bed-piece A, with its hooks *a* one in one end of the tube *d*, and the other in the opposite end of the tube *d'*, as already described. The outermost coil at each end is placed between the corrugation *c* and the projecting edges of the holes *e*. The spring is then fastened securely to its bed by the rod *f*. To place it in position and fasten it, I bend up or forward one of the tongues *b'*, pass the rod *f* from the under side through the hole *c'*, along through the spiral *a*, and into the opposite hole *c*. The tongue *b'* then being bent back to its place, prevents the removal or escape of the rod *f*, and nail-holes *i* being punched, the spring-rack is complete.

It will be observed that the tubes *d* and corrugations *c* inclose a rectangular or oblong space, within which rests the spiral spring or coil, or, what it amounts to, the series of self-connecting springs *a*. This series of springs *a* is of such length and diameter that when somewhat distended, and the hooks *a′ a′* are inserted in opposite ends of the opposite tubes *d d′*, it will, by its elasticity, hold itself in position, while the coils shall touch the bed-piece A in three lines, to wit: along the face of each of the tubes *d d′*, and along the middle of the flat surface or body. The fastening-rod *f* is made straight, of stiff wire, and just long enough to extend along the bed-piece through the spiral *a*, and enter the holes *c′* in the corrugations *c*. Hence the tubes *d d′* prevent the spring *a* from moving laterally, or sliding, or rolling from side to side, as pencils, pens, &c., are put in or taken out, and the corrugations *c* prevent the undue elongation of the spring, and secure it against moving longitudinally at either end so far as to interfere with its use for the purposes named.

One characteristic and distinguishing feature of my invention is that the wire which forms the spring is bent into a continuous curve, and a curve of such form that its successive folds or coils are in close proximity to each other, so that each fold or coil will operate in connection with each next fold or coil to hold a pencil or other article placed therein, and so that the elasticity of the whole spring shall be available to hold a single article inserted at one point in the spring, or a number of articles inserted at different points. All parts of the spring except the extreme ends, while elastic, as described, have a free longitudinal motion within certain limits, so that articles of various sizes can be introduced between them. The entire elasticity of the spring is then available to hold any such articles placed therein, be they few or many; but the coils may be made, to a certain extent, independent of each other by the use of holes *e*, with projecting or raised edges between each two coils, or each coil may be otherwise fastened to the bed-piece.

In like manner the different coils may be made of separate pieces of wire, and fastened, in close proximity to each other, to the bed-piece; but the construction first described is preferable.

The operation of the devices described is then very simple. A pen-holder or pencil, for instance, being pressed against the springs will pass between the coils and be securely held till wanted. The springs are made self-connecting or in continuous curve, so that they can be formed, applied, and fastened for use either with or without a bed-piece, A, more quickly and cheaply than separate independent springs, and with the use of less material. Being elastic, the coils or folds act upon each other, so as to hold articles of quite a variety of sizes, as letters, cards, pen-holders, pencils, brushes, tools, &c.

What I claim as my invention, and desire to secure by Letters Patent, is—

1. A wire spring of spiral or other continuous curve, when so made as to be fastened by hooks, eyes, or other similar device, either with or without an intermediate bed-plate, to a desk, table, pedestal, or other like object, for use as a spring-rack, substantially as hereinbefore set forth.

2. A bed-piece so made with raised sides and ends as that a spring of continuous curve, placed in the space inclosed therein and properly fastened, shall be secured against both lateral and undue longitudinal motion, substantially as and for the purposes hereinbefore set forth.

3. Fastening a spring or springs of continuous curve to a bed-piece, by a fastening-rod passing longitudinally through or along the spring or springs and properly secured at each end, substantially as and for the purposes hereinbefore set forth.

4. A spiral or other continuously-curved spring or springs, *a*, in combination with a metallic bed-piece, A, by which to fasten the spring to a table, or pedestal, or other like object, substantially in the manner and for the purposes hereinbefore expressed.

In testimony whereof I, the said JAMES ADAIR, have hereunto set my hand.

JAMES ADAIR.

Witnesses:
R. G. HOPE,
C. WELLS.